April 2, 1968

J. R. VANDE WEGE 3,376,398

AUTOMATIC CENTRAL-OFFICE EQUIPMENT
TESTING ARRANGEMENT

Filed April 20, 1964

INVENTOR.
John R. Vande Wege

BY
ATTY.

United States Patent Office 3,376,398
Patented Apr. 2, 1968

3,376,398
AUTOMATIC CENTRAL-OFFICE EQUIPMENT TESTING ARRANGEMENT
John R. Vande Wege, Glen Ellyn, Ill., assignor to Automatic Electric Laboratories, Inc., Northlake, Ill., a corporation of Delaware
Filed Apr. 20, 1964, Ser. No. 361,127
9 Claims. (Cl. 179—175.21)

ABSTRACT OF THE DISCLOSURE

Marker-controlled coordinate switching system is arranged to permit test calls to subscriber lines via same terminating junctors and line section switching path as are used for normal calls. The switched path from a wire-chief or routiner junctor through selector matrices to the terminating junctor include an extra control conductor, while the path from there through the line section includes only the two transmission conductors and the path-holding conductor. Each terminating junctor includes a relay operated during test calls for metallic cut-through. A relay tree is provided in the marker to connect to the cutoff relay of the line circuit for bridge cutoff control. During routiner calls the path from a terminating junctor to a called line may be released while the preceding path is held, and another path is then established from the same junctor to another called line for testing.

---

This invention relates to an automatic central-office equipment testing arrangement, and more particularly to an arrangement for automatically performing a wire-chief inward equipment test for a communication switching system.

The principal object of this invention is to provide an arrangement to automatically perform the wire-chief inward equipment test for central-office equipment of a communication switching system in a more efficient and economical manner.

According to the invention, a connection is established through the switching network of a communication switching system from a wire-chief test desk to a called line so that the wire-chief test man can perform an inward equipment test; i.e., seizure of the central office equipment for a given line from the test desk to thereby test whether the switching equipment can establish a connection to the line in question. As a result, additional switching equipment is not necessary to establish this test connection from the test desk to the called line. A relay circuit is provided to connect a shunt circuit across the cutoff relay of the line circuit associated with the line in question in response to a ground signal from a wire-chief test desk via a wire-chief junctor circuit. The shunt circuit is a low-impedance relay connected in parallel with the cutoff relay by means of a relay tree which selects the particular line circuit of the line group. This relay then causes the cutoff relay to restore, thereby connecting the line relay to the switching stages in order to initiate a call, while maintaining the original connection from the wire-chief test desk to the line in question. If the equipment is functioning satisfactorily, a second connection is established to the line relay, thereby increasing the current to the cutoff relay and also to the low-impedance relay, which causes the low-impedance relay to operate and to thereby release the common equipment. The relay tree eliminates the necessity of switching an extra control lead through the switching stages for every call, whereas the relay tree only functions during a wire-chief call.

Other objects and features relate to a timing arrangement in the wire-chief junctor which generates a timed ground-pulse signal in response to a manually applied ground-pulse signal from the wire-chief desk, indicating that the inward test should be established; whereas a complete removal of ground indicates a release condition. This timing circuit allows the wire-chief test man to test a switching system using my novel arrangement in exactly the same manner as he would test an electromechanical step-by-step switching system, because the manually applied pulse that is used for restoring the cutoff relay in a step-by-step system via a separate control lead is used by the timing apparatus to be used in my arrangement.

The above-mentioned and other objects and features of this invention and the manner of attaining them will become more apparent, and the invention itself will be best understood, by reference to the following description of an embodiment of the invention taken in conjunction with the accompanying drawings comprising FIGS. 1–11 wherein.

FIGS. 3–10 when arranged as shown in FIG. 11 comprise a schematic and a functional block diagram of the wire chief and routiner test-call arrangement.

The invention is explained according to the following outline:

Part 1.—System organization
Part 2.—Typical call
Part 3.—Wire chief and routiner test calls
Part 4.—Test desk and test distributor
Part 5.—Wire chief junctor
Part 6.—Routiner and routiner junctor
Part 7.—Terminating junctor
Part 8.—Test call operation

PART 1.—SYSTEM ORGANIZATION

Figure 2:
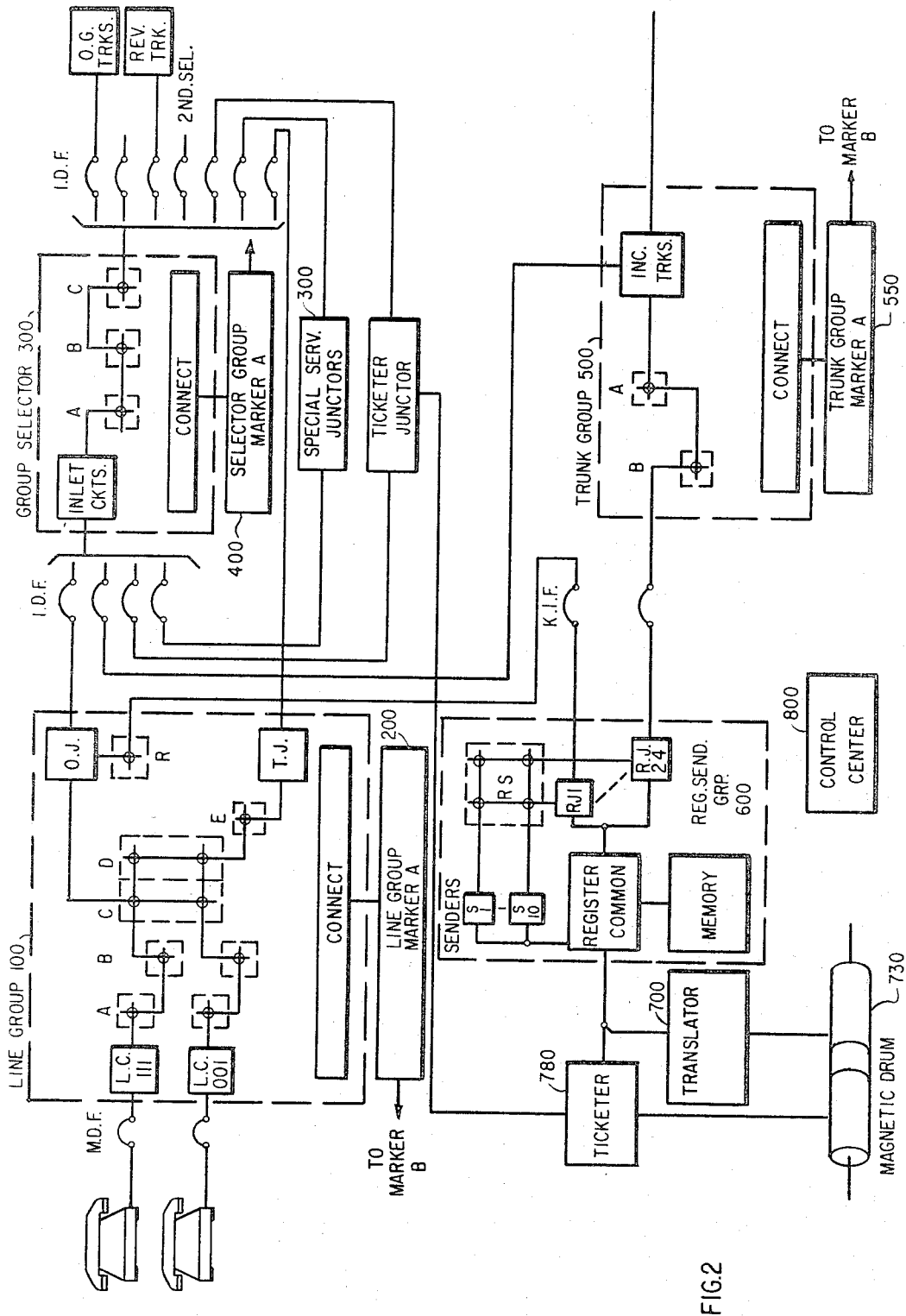
FIG. 2 is a block diagram of a telephone switching system.

Referring now to FIG. 2, the system consists of the line group 100, group selector 300, register-sender group 600, and the translator 700. There is also a trunk group 500 which provides access from incoming trunks to the registers, and a control center 800 which contains a special computer for operation analysis and recording, and program upgrading equipment. For further description of the system in general and the line group 100 the following pending United State patent applications may be referred to:

K. K. Spellnes, Ser. No. 230,887, filed Oct. 16, 1962, now Patent No. 3,170,041;

M. H. Esperseth, K. K. Spellnes, W. R. Wedmore, and F. B. Sikorski, Ser. No. 240,497, filed Nov. 28, 1962, now Patent No. 3,275,752; and W. R. Wedmore, Ser. No. 304,892, filed Aug. 27, 1963, now Patent No. 3,293,368.

All of the electronic equipment is furnished in duplicate, for instance, two line group markers 200 may serve up to ten line groups and two group selector markers 400 may serve up to ten group selectors. A minimum of two register-sender groups 600 will be equipped per office and the translator 700, including the magnetic drum 730 and logic circuitry, will always be furnished in pairs per ten thousand directory numbers.

Time division techniques are used in the register-sender group 600 and in the translator 700. For further description of the register-sender group the following pending United States patent applications may be referred to:

B. Sherstiuk, Ser. No. 280,053, filed May 13, 1963;
B. Sherstiuk, Ser. No. 304,827, filed Aug. 27, 1963, now Patent No. 3,278,693; and D. Lee and H. Wirsing, Ser. No. 308,112, filed Sept. 11, 1963, now Patent No. 3,301,963.

The markers are designed on an electronic basis and semiconductor circuitry is employed throughout the system. A ferrite core memory is used for temporary storage whereas the magnetic drum 730 is used for semipermanent storage.

The space division switching elements of the system consists of reed relay matrix assemblies in configurations of 10 x 6, 10 x 5 and 10 x 4. The crosspoints are made up of reed capsules and having normally two windings. They are mounted on a two layer printed card and the entire assembly constitutes a switching matrix. In some caes the cards are wired together to form a single larger matrix. The system contains no conventional telephone relays, but, similar functions are performed by reed relays. A reed relay assembly is essentially a cluster of magnetic reed elements controlled by coil windings and with or without a premanent magnet. For further description of the reed relay assemblies and cross-point matrix assemblies the following pending United States patent applications may be referred to:

E. J. Glenner and K. K. Spellnes, Crosspoint Switching Arrays, Ser. No. 127,237, filed July 27, 1961, now Patent No. 3,188,423;

G. S. Lychyk and A. Taliste, Dry Reed Relays, Ser. No. 127,648, filed July 28, 1961, now Patent No. 3,128,356;

P. K. Gerlach, G. J. David and R. O. Stoehr, Printed Matrix Board Assembly, Ser. No. 132,897, filed Aug. 21, 1961, now Patent No. 3,193,731.

The electronic logic circuitry employs eight standard circuits as building blocks. These standard circuits include NOR gates, inverters, flip-flops, clocks, gated pulse amplifiers, parallel test circuit, parity circuit, and reed relay driver. All of these circuits are implemented on double or single-sided printed cards, 6 inches by 5½ inches.

The two switching stages, the line group and group selector may not necessarily be installed in the same building. The line group may be remotely located and will then operate as a satellite office. No register-senders will be needed in the satellite, but a transceiver will provide for sending and receiving of switching information between the markers of the satellite and the register-senders in the main offiice.

The method of signaling between the system groups is accomplished by a technique called di-phase. This method employs a phase shift technique for serial sending and receiving of pulses.

The group selector may, in connection with the register-sender group and the translator, operate as a trunk tandem office and for this purpose the line group is not necessary. By using matrices with six reed capsules per crosspoint, this group selector marker may accommodate 4-wire switching.

The reason for this flexible operation of the system lies in the fact that the register-sender group, in connection with the storage in the translator, has sufficiently built-in features for the above described operation.

PART 2.—TYPICAL CALL

As an introduction to the system operation, a brief description of a typical local call as processed through the system is now presented. The block diagram in FIG. 2 may be followed for tracing the call.

When a subscriber lifts the handset, the line group marker 200 goes into action by detecting the originating call mark, identifying the calling line, and selecting an idle register junctor within the register-sender. A path is then temporarily established from the calling telephone to the register junctor via the A, B, C, and R matrices, and the subscriber receives dial tone. The dialed digits are stored temporarily, coded, and processing is continued as these digits are passed to the translator 700, analyzed for type of incoming call, and instructions are selected from the drum memory 730 and returned to the register-sender 600 to guide further handling of the call. Upon receipt of the remaining digits, the translator 700 returns switching instructions corresponding to the called number as stored in the drum memory 730. The instructions are transmitted from the register-sender 600 via one of the senders and the originating junctor of the originating line group to the group selector 300. In the group selector 300, the instructions are analyzed by the marker 400, an idle terminating junctor in the terminating line group is located, and a path established to that line group via the A, B, and C matrices of the group selector. The remaining instructions are followed by the line group marker to locate the called line terminals, select and seize a path from the terminating junctor through the E, D, B and A matrices to the called line. The terminating junctor established ringing, answer supervision, and talking battery for both parties when the call is answered.

Since the system is a common control operation, the markers of the line group and group selector function only to serve the assigned portion of the call processing then release to serve other calls. The register-sender 600 and the translator 700 are functioning on a time division basis and therefore are processing several calls simultaneously. The temporary signaling and control talking paths are held through the switching matrices and junctors.

PART 3.—WIRE CHIEF AND ROUTINER TEST CALLS

Figure 1:
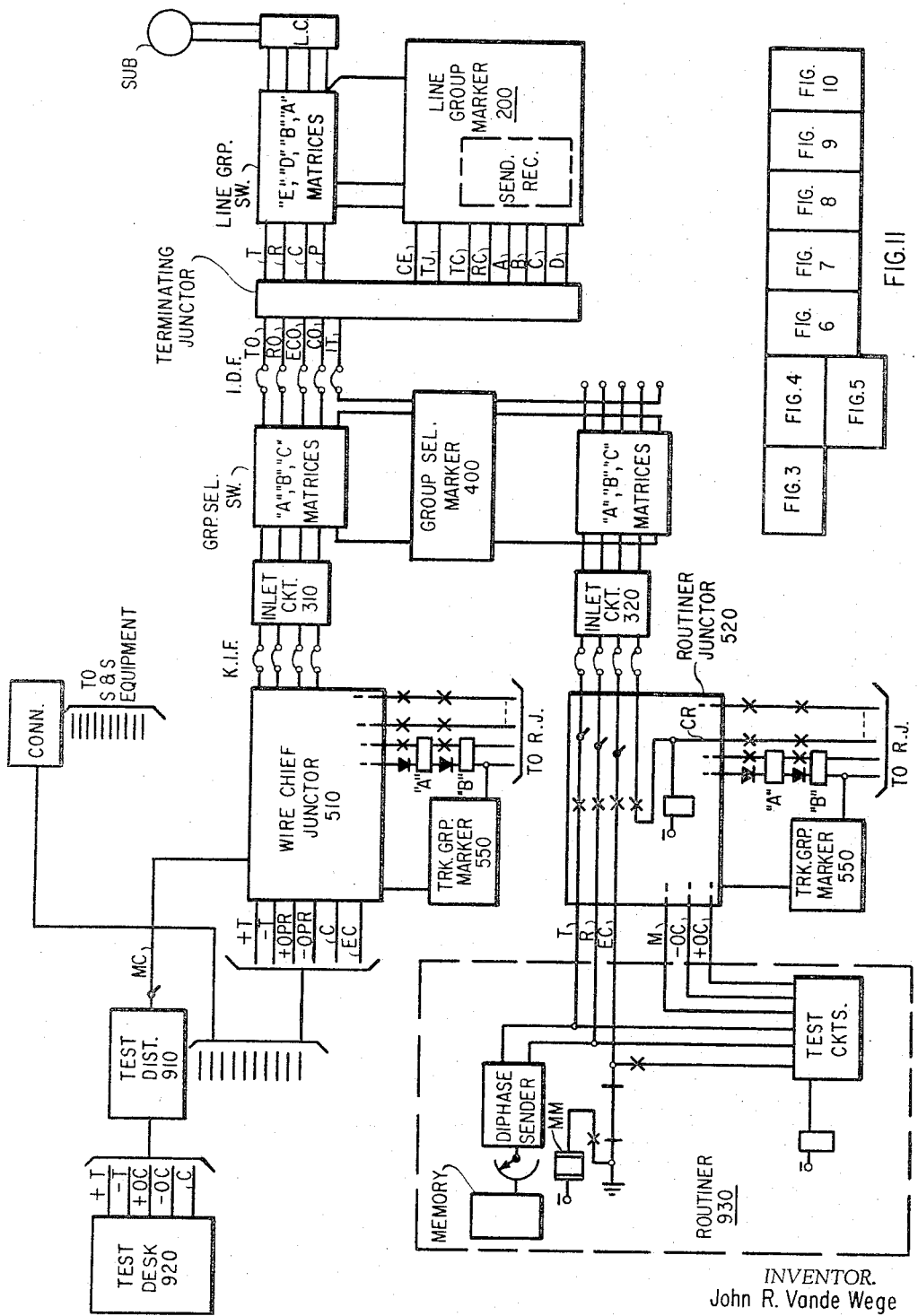
FIG. 1 is a block diagram of the wire chief and routiner test-call arrangement.

Refering now to FIG. 1, the system is provided with facilities for testing the outside cable plant, subscribers' equipment, and central office equipment. A certain amount of this testing can be done from test desk 920 located in the central office. In a single office exchange and in some of the multi-office exchanges, the test desk is connected to the system via test distributor 910 and the wirechief junctor 510, which is connected to the banks of the test distributor 910 in the same office. A step-by-step test connector can also be connected to the bank contacts of test distributor 910 so that step-by-step equipment can also be accessed by test desk 920. The purpose of the test distributor is to select the proper wire-chief junctor, or test connector, associated with any one of the 100-line groups in an office. The purpose of the wirechief junctor, or the test connector, is to select the line to be tested in a particular 100-line group. The wire-chief test man dials a first digit to step the test distributor 910 vertically and then a second digit to rotate the distributor to the proper position for access to a given wire-chief junctor or test connector. Thereupon, three additional digits are dialed to access a given line for testing purposes.

The wire-chief junctor 510 is one of the incoming trunks of the trunk group 500, which is connected via the A and B matrices to the register-sender group 600 under the control of the trunk group marker 550. The wire-chief junctor 510 is connected via the KIF distributing frame to inlet circuit 310 of the group selector 300, and thence to the IDF distributing frame via the A, B, and C matrices of the group selector under the control of the group selector marker 400. A connection is thereby established to a terminating junctor, which then establishes the terminating connection via the E, D, B, and A switching stages, under the control of the line group marker 200, and thence to the particular line circuit of the line to be tested. Test desk 920 can thereby establish a direct, metallic connection to a given subscriber's line for testing purposes.

Routiner 930, similarly, can establish a connection via the routiner junctor 520 of the trunk group 500 under the control of the trunk group marker 550. The routiner junctor 520 is another incoming trunk of the trunk group 500, which initiates a connection via inlet circuit 320 to a particular 100-line group of the system via the A, B, and C matrices of the group selector 300, and thence to the IDF distributing frame. The terminating connection is similar to the terminating connection for a wire-chief call.

Routiner 930 thereby establishes a direct-metallic connection to a line in a 100-line group for testing purposes. Furthermore, the routiner 930 accesses each line in the 100-line group sequentially, while maintaining the connection from the routiner 930 to the terminating junctor and only dropping the connection from the terminating junctor to the line in question upon accessing a new line.

PART 4.—TEST DESK AND TEST DISTRIBUTOR

Figure 3:
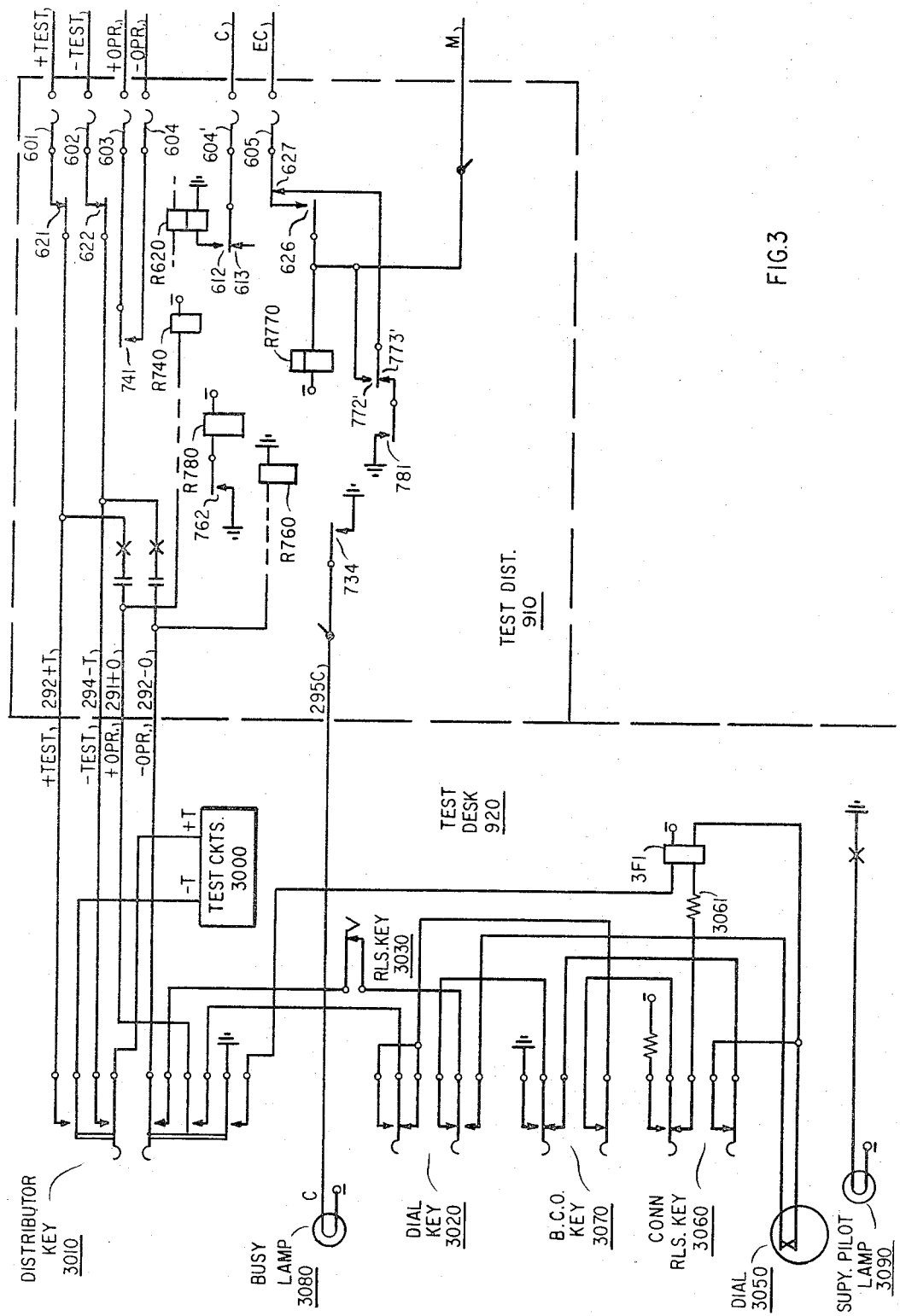

Referring now to FIG. 3, test desk 920 is a conventional wire-chief test desk consisting of test circuits 3000, dial 3050, relay 3F1, and various keys and lamps. Test distributor 910 is a conventional test distributor circuit as disclosed in U.S. Patent 2,866,008, see test distributor 910 shown in FIGS. 6 and 7. Test distributor 910 can be used in this system substantially as shown with one minor modification. Lead M has been added from relay R770 to each wire-chief junctor connected to test distributor 910 without being connected via the bank contacts. This added connection is necessary to enable the test distributor to work with both a step-by-step test connector and a wire chief junctor due to an incompatibility in the two types of systems. In a step-by-step system, the EC lead is connected directly from the test distributor to the called line and therefore ground is returned almost immediately to the test distributor to operate relay R770 in the event that the called line is busy. However, in a system that does not switch an EC lead all the way from a calling line to a called line, relay R770 restores (after a slow-to-release interval) before the markers determine that the called line is busy. Relay R770 must be operated when ground is returned via lead EC to lock relay R770 indicating a busy condition, because lead EC is coupled to relay R770 via its own contacts 772'. Ground via lead M, therefore, causes relay R770 to operate so that ground via lead EC can cause relay R770 to lock, thereby indicating a busy condition.

PART 5.—WIRE CHIEF JUNCTOR

Figure 4:
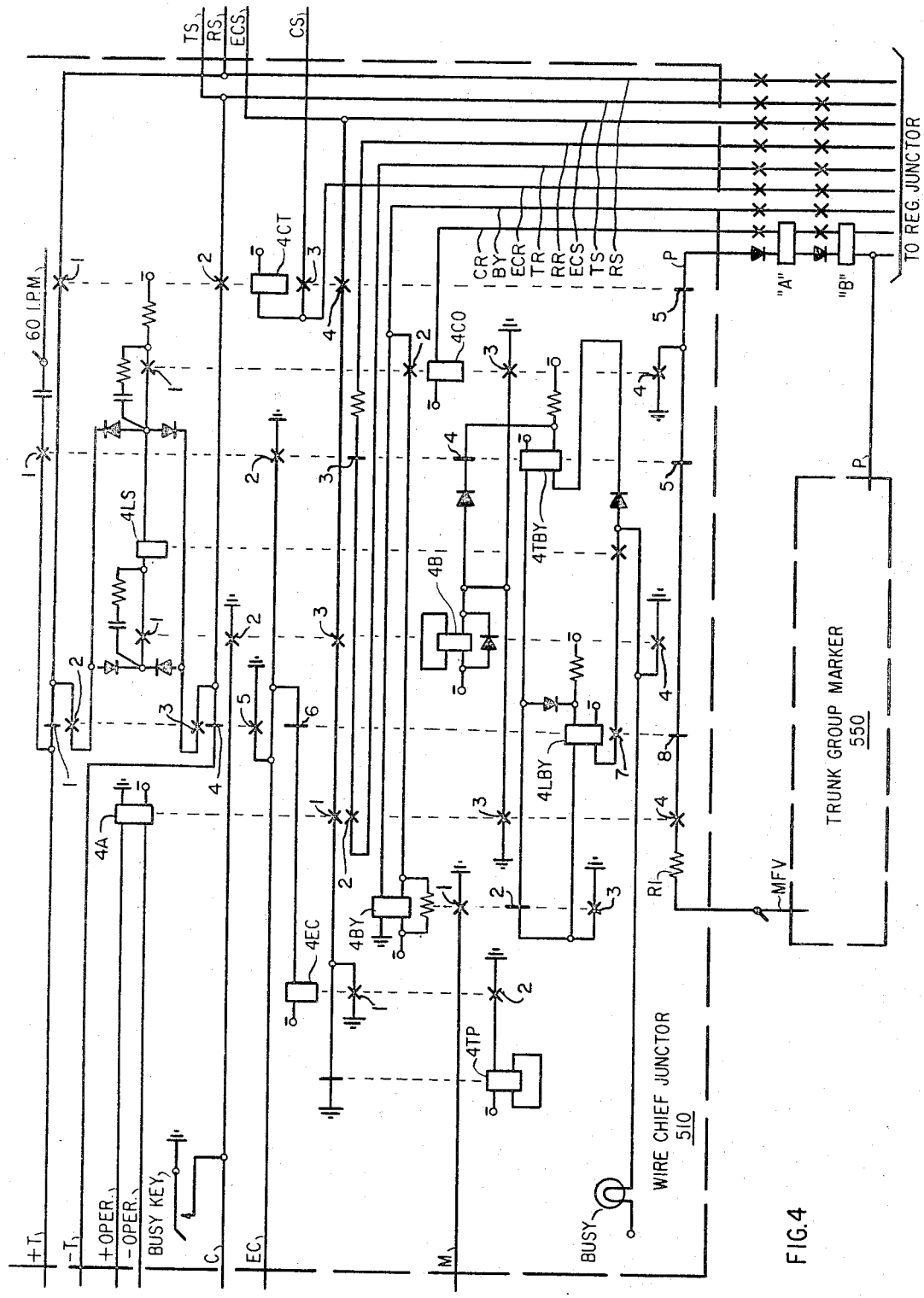

Referring now to FIG. 4, the wire-chief junctor circuit 510, which is one of the incoming junctors of the trunk group 500, provides access to the system from the wire-chief test desk 920 via test distributor 910. The wire chief can access the system in order to test a line; and furthermore the wire-chief junctor circuit includes relay 4LS to camp-on a busy line and to automatically cut-through when the line becomes idle. It can be noted that this relay 4LS can also be used in other types of junctor circuits to camp-on a busy line to automatically cut-through when the line becomes idle, establishing a new connection from another calling line to the line in question.

The wire-chief junctor circuit 510 also seizes the trunk group marker 550 upon seizure of the wire-chief junctor to establish a connection to an idle register junctor. Thereupon, dial pulses are detected and then repeated to the register junctor to establish a connection to the called line via the group selector 300, terminating junctor, and thence to the line group. The wire-chief junctor also holds the terminating junctor and, therefore, the group selector matrix via the ECS lead.

Relay 4A is operated in response to the receipt of dial pulses which then repeats the dial pulses via lead TR and RR to the incoming register junctor 624. Relay 4CO is the control relay which operates when a connection is established to an idle register junctor. Relay 4BY is a differentially wound reed relay which operates in response to either a ground signal or a negative battery potential via lead BY from the register junctor, thereby designating either a trunk busy condition or alternatively a line busy condition respectively. The break contacts are held normally closed by permanent magnet which in relay 4BY is opposed by the upper winding and aided by the lower winding; therefore ground on lead BY shunting the upper winding causes the make contacts to operate to the closed condition and the break contacts to remain closed, so that contacts 2 and 3 provide an operate path for relay 4TBY when a trunk busy condition is signalled. Relay 4LBY operates and locks in response to relay 4BY during a line busy condition to connect relay 4LS across leads TS and RS. Therefore, relay 4LS remains connected across leads TS and RS even after the register junctor has released which causes relay 4BY to restore. Relay 4LS is the loop sensing relay which operates in series with the battery-feed relay for the busy line which is to be tested. This relay has a diode bridge associated with it so that the relay operates even with different battery polarities present on leads T and R, i.e., ringing, etc. This relay remains operated as long as the line to be tested remains busy. Once the busy line becomes idle, relay 4LS restores and thereby causes relay 4LBY to restore. The restoration of relay 4LBY causes relay 4EC to operate and transmit a signal to the wire-chief test desk 920 via test distributor 910 indicating that the line to be tested has become idle. Relay 4TBY is the trunk busy relay which designates that a trunk busy condition has occurred. Relay 4B operates in response to the operation of relay 4A upon seizure by the wire chief and remains operated so long as the wire chief junctor is seized. Relay 4CT is the cut-through relay which is operated when a connection is established to a register junctor and also when a connection is established to the line that is to be tested by means of the terminating junctor.

Relay 4TP is a timing relay that provides a time-delayed ground pulse on lead ECS designating the performance of the inward equipment test. When the wire chief operates B.C.O. key 3070, relay 4EC restores, thereby removing ground from lead ECS and opening the circuit to relay 4TP. Since relay 4TP is slow to release, ground is re-connected to lead ECS within 50 milliseconds (the slow-to-release interval of relay 4TP), thereby designating the performance of the inward test. This timed ground pulse is detected in the line group marker and distinguished from a release signal, which would be complete removal of ground from lead ECS. Note that the timed-ground pulse is generated for 50 milliseconds regardless of when B.C.O. key 3070 is released so that the wire chief test man can perform the inward equipment test in exactly the same manner for a step-by-step system or for the system described herein.

PART 6.—ROUTINER AND ROUTINER JUNCTOR

Figure 5:
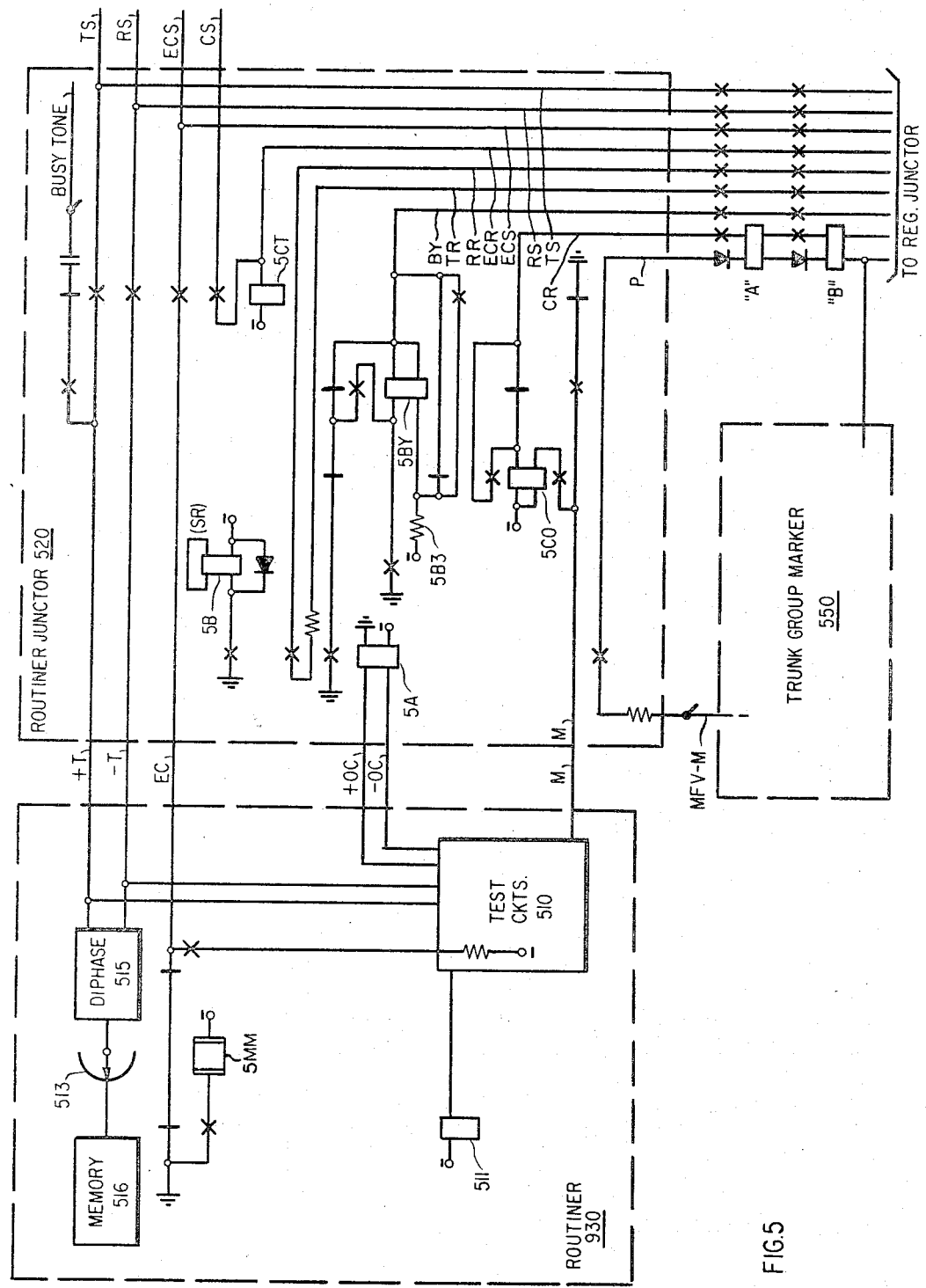
Figure 6:
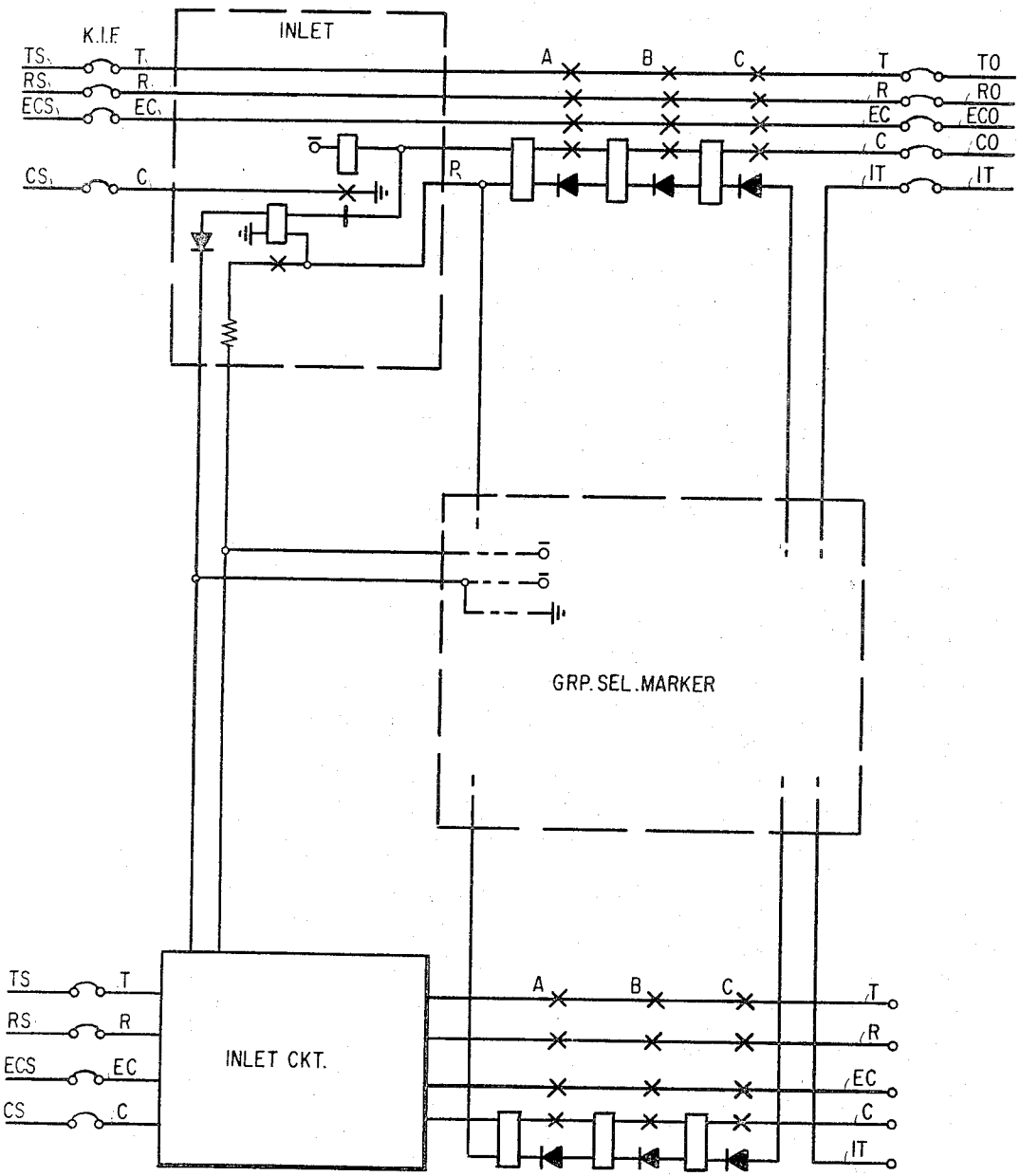

Referring now to FIG. 5, routiner 930 comprises test circuits 510, a diphase sending unit 515, memory unit 516, and other control circuitry. The routiner 930 accesses a line group for testing purposes by initially sending dial impulses via leads +OC and −OC. Thereupon the diphase sender unit 515 sends switching digits to access a particular called line for testing purposes. The diphase unit 515 selects each number of a 100-line group from memory unit 516 via rotary switch 513 with its associated motor magnet 5MM. After the test has been completed for a given line by testing circuits 510 via leads +T and −T, relay 511 operates and thereby disconnects ground from lead EC to drop the connection from the terminating junctor to the called line. Also, ground is connected to motor magnet 5MM to step rotary switch 513 to access another set of switching digits from memory unit 516 for transmission by diphase sender 515 via leads +T and −T to the line group. Thereupon, a new connection is established to another line in the same 100-line group, and thence relay 511 restores to provide a holding ground via lead EC for the new connection. Upon release after every line has been accessed in the 100-line group, a negative potential is applied to lead EC to thereby indicate a release condition from the test circuit unit 510.

Routiner junction 520 is substantially similar to wire chief junctor 510, except that line busy and trunk busy relays, or a wire-chief test timing relay, are not needed. Also, an extra-control relay (EC) is not needed because it is necessary to have lead EC cut-through to the terminating junctor. Also, relay 5CO has an additional winding to lock relay 5CO after the register-sender group has released to thereby prevent relay 5CO from shunting the hold path of relay 5BY, consisting of ground via contacts of relay 5B, the upper winding of relay 5BY, the lower winding of relay 5BY, and resistor 5B3 to the negative potental. The remaining relays, 5A, 5B, and 5CT, perform the same functions as their corresponding relays in the wire-chief junctor 510.

PART 7.—TERMINATING JUNCTOR

Figure 7:
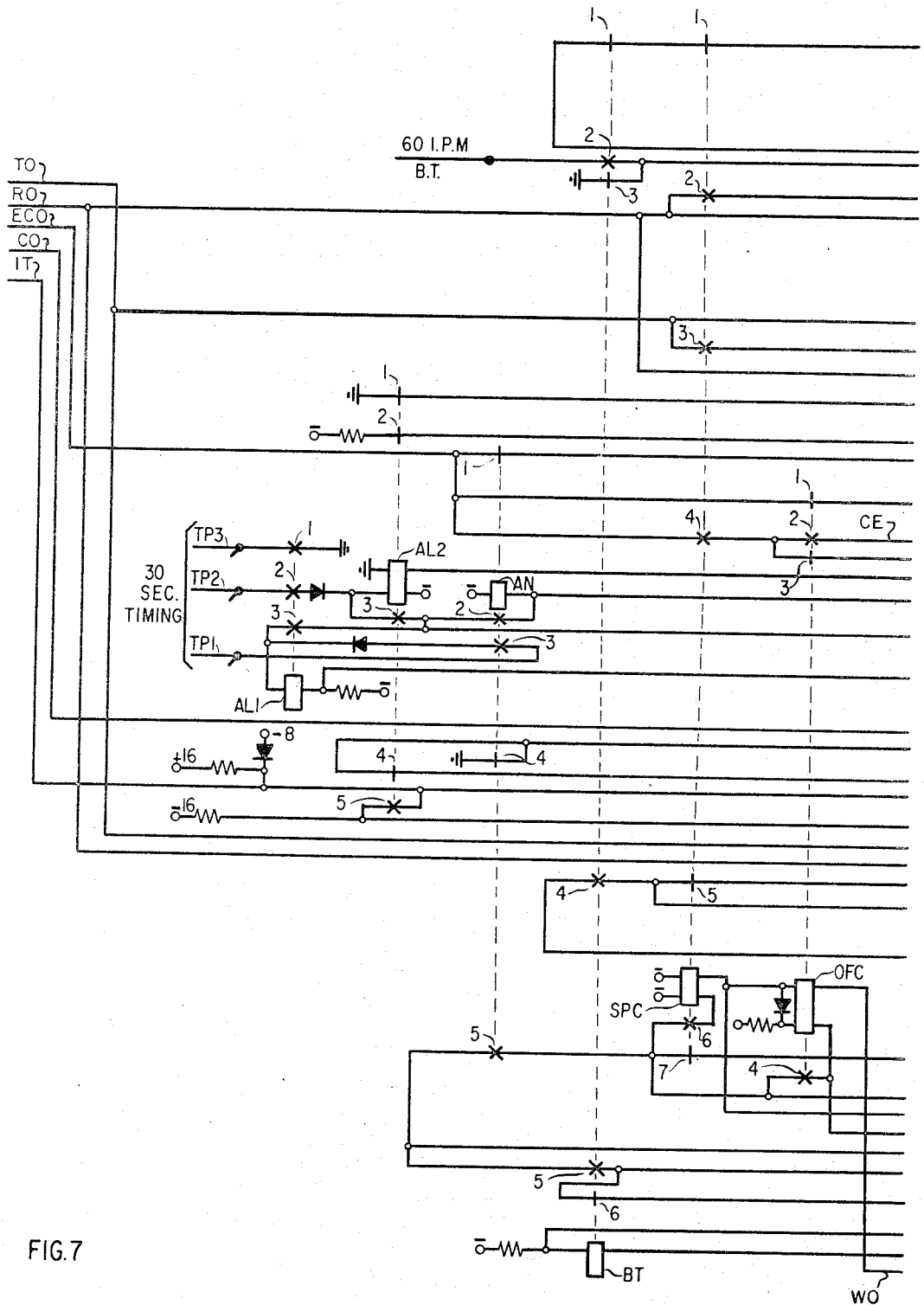
Figure 8:
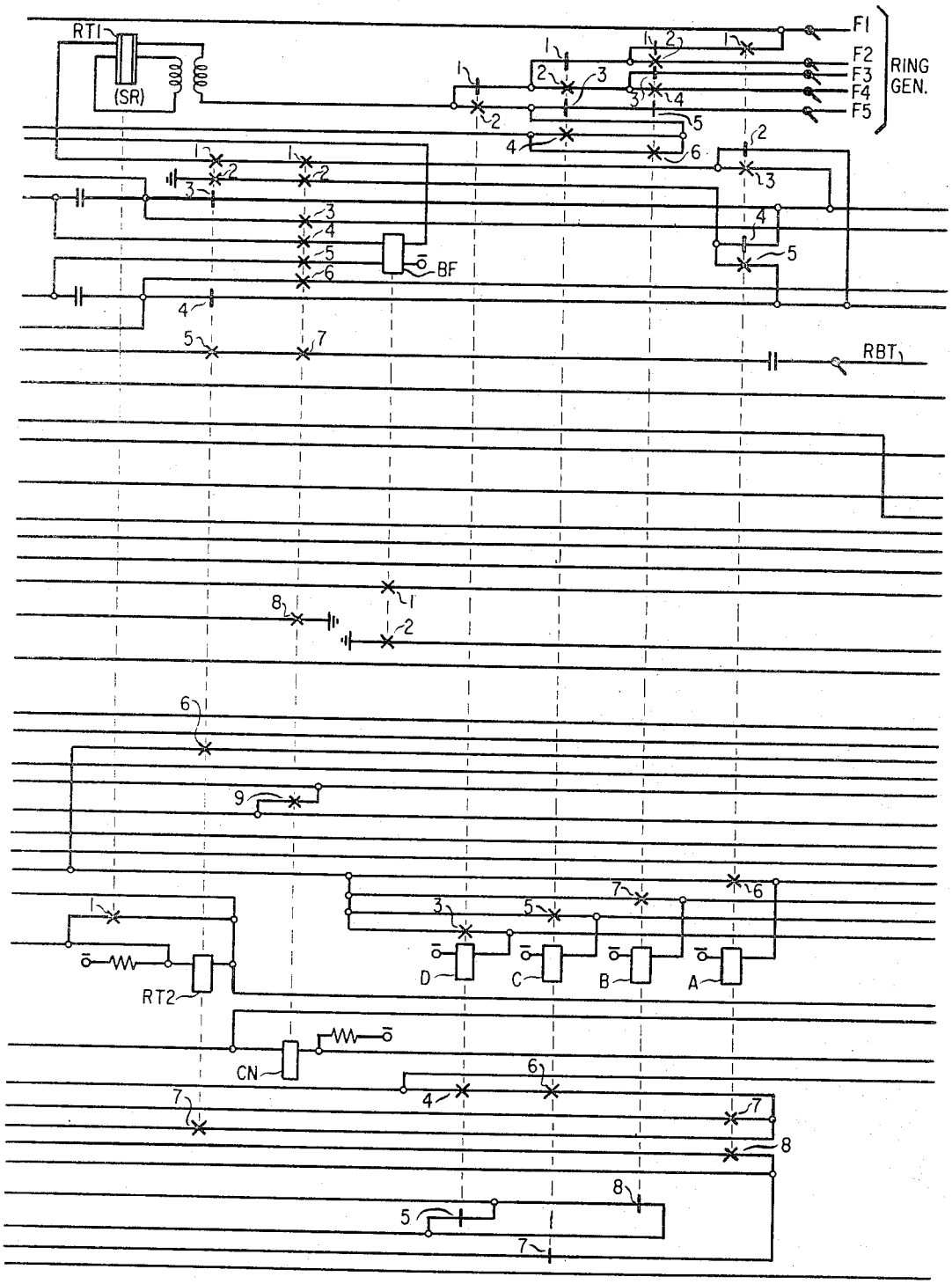
Figure 9:
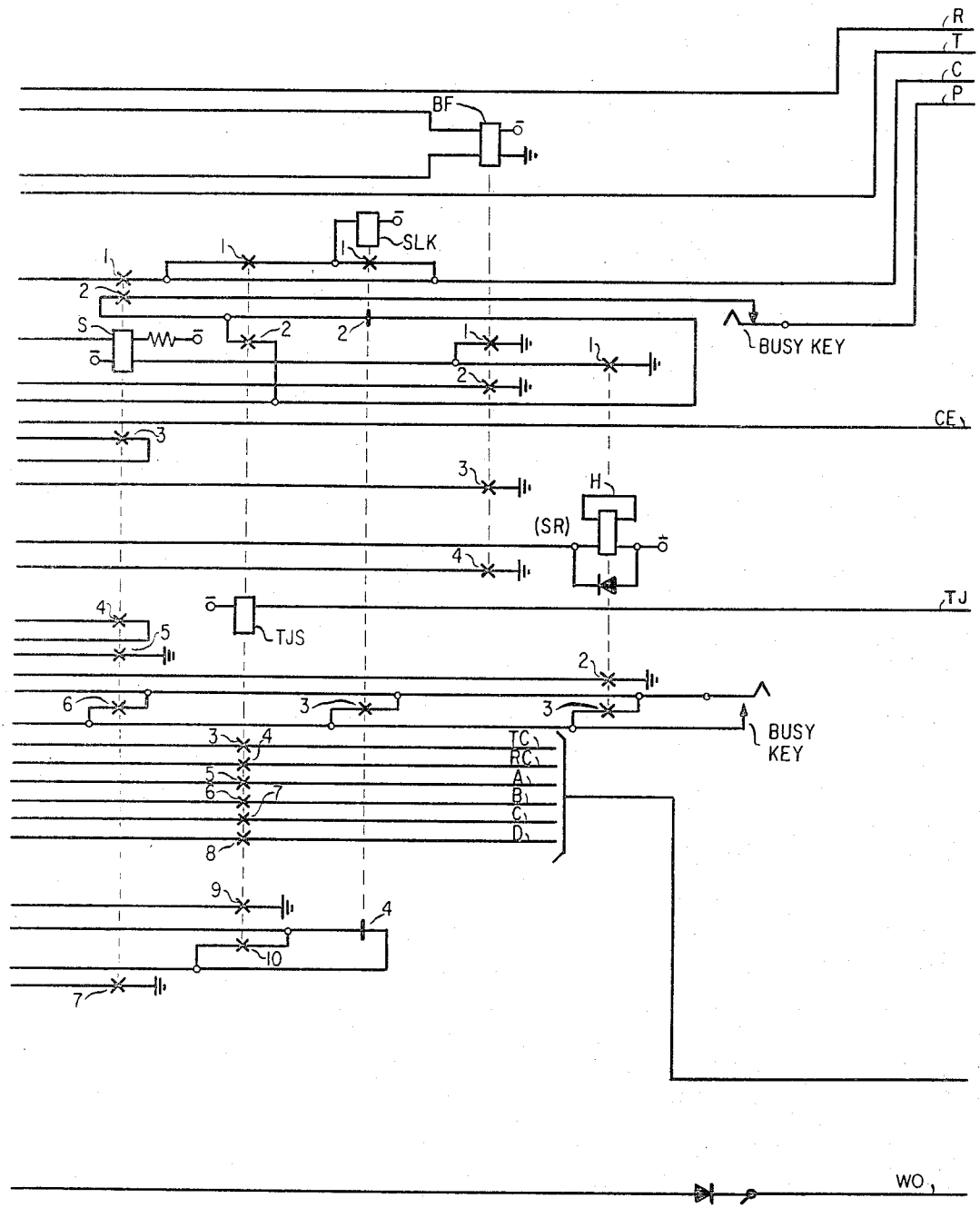
Figure 10:
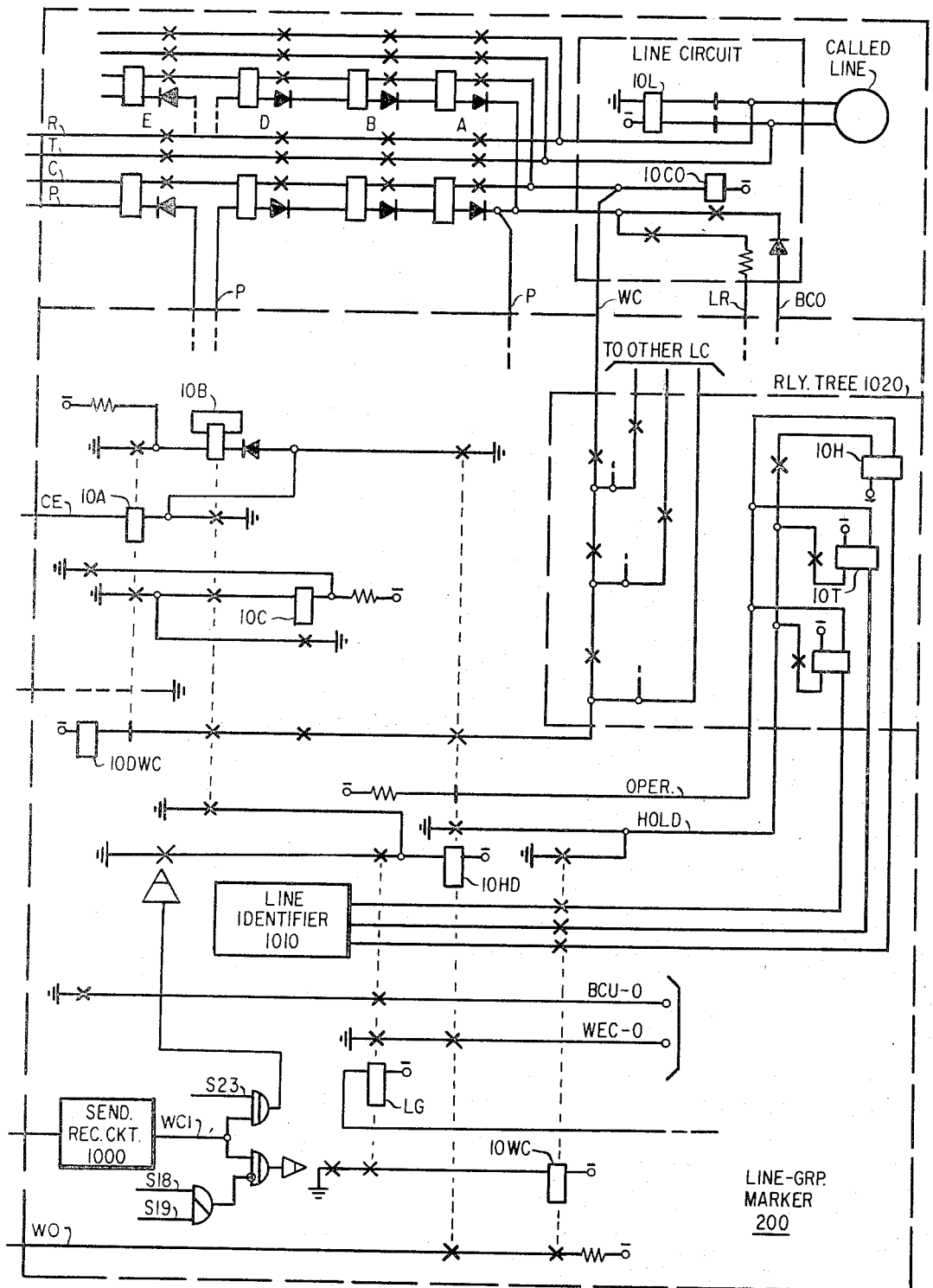

The terminating junctor is shown by a schematic diagram in FIGS. 7, 8, and 9. It provides access from a group selector outlet, via the IDF through the junctor and thence through matrices E, D, B and A to a called line.

Battery feed is provided to the calling line by relay 8BF, and to the called party by relay 9BF.

Busy-idle indication is provided on lead IT for use by a parallel test circuit in the group selector marker.

Relay 9TJS when operated provides a path from the TO and RO conductors to conductors TC and RC, which completes a path from the sender over the transmission path to the send-receive circuit in the marker. This relay is operated under the control of the marker by a signal on lead TJ. Relay 9TJS also completes a path for the ringing code signals from the send-receive circuit on conductors A, B, C and D to the ringing control relays 8A, 8B, 8C, and 8D.

The junctor is seized by ground forwarded via lead ECO to operate relay 9S. This relay through its contacts 4 completes a path to ground to hold the preceding switch train, and through its contacts 1 completes a path to ground to hold the succeeding switch train.

Operation of one or more of the relays 8A, 8B, 8C and 8D, applies one of five different ringing frequencies to either lead T or lead R to provide fully selective five-party bridged or ten-party divided ringing, in accordance with the binary code received on leads A, B, C and D as shown in the following table.

| A | B | C | D | Gen. Connection | Ringing Frequency |
|---|---|---|---|---|---|
| 0 | 1 | 0 | 1 | T | F1 |
| 1 | 0 | 0 | 0 | R | F1 |
| 0 | 1 | 0 | 0 | T | F2 |
| 1 | 1 | 0 | 0 | R | F2 |
| 0 | 0 | 1 | 0 | T | F3 |
| 1 | 0 | 1 | 0 | R | F3 |
| 0 | 1 | 1 | 0 | T | F4 |
| 1 | 1 | 1 | 0 | R | F4 |
| 0 | 0 | 0 | 1 | T | F5 |
| 1 | 0 | 0 | 1 | R | F5 |
| 0 | X | 1 | 1 | T | F1 |
| | | | | Special Functions | |
| 1 | 1 | 0 | 1 | Return line busy (60 IPM) | |
| 0 | X | 1 | 1 | No ans. supy. (OFC operates) | |
| 1 | X | 1 | 1 | No ans. supy. or ringing (OFC) & metallic cut-thru (SPC operates) | |

Ringback tone from the source on lead RBT is supplied to the calling party during ringing. Busy tone from the 60 IPM source is supplied to the calling party when the proper binary code as shown in the table is received from the marker to operate relay 7BT.

In response to answer supervision ring trip relay 8RT1 operates and at its single make contacts shorts the winding of relay 8RT2, which connects the called party to the voice transmission path. Relay 9BF then operates, and at its contacts 2 applies ground which extends through break contacts of relay 7OFC to lead ECO to repeat answer supervision to the preceding switch train.

In response to one of the codes as shown in the table, relays 7SPC and 7OFC operate to provide a metallic path (T and R) free of attachments and inhibits ringing and answer supervision for verification, wire chief, and routiner calls. In response to another code, relay 7OFC operates to inhibit answer supervision on calls to official numbers, such as the telephone company business office.

Release of the succeeding switch train may be controlled by routiner 910. Opening lead ECO releases the succeeding switch train but holds the terminating junctor seized. The terminating junctor is released when negative battery potential is applied to lead ECO.

Release of the preceding switch train is delayed approximately 135 milliseconds after the calling party releases to protect against unintentional interruption of the calling loop.

Timed disconnect of the preceding switch train and the terminating junctor 30 seconds after the called party disconnected is provided.

An arrangement is provided to permit the called party to hold the succeeding switch train and the terminating junctor.

PART 8.—TEST CALL OPERATIION

Referring now to FIGS. 3–10, arranged as shown in FIG. 11, a wire-chief test call can be initiated from test desk 920 via test distributor 910 to the wire-chief junctor 510 for access to a given called line. Also, each line of a hundred line group can be accessed for testing purposes from routiner 930 via the routiner junctor 520. The wire-chief test call is initiated manually via test desk 920 for a given line; whereas, routiner 930 automatically and sequentially accesses each line of a hundred-line group.

Wire chief call

Wire chief test desk 920 seizes a given line by operating distributor key 3010, thereby causing relays R760 and R740 in the test distributor 910 to operate in series. Thereupon, two digits are dialed from dial 3050 which causes the test distributor switch to advance one step vertically and one step rotationally, thereby connecting the test distributor 920 to the wire chief junctor 510 via the bank contacts of test distributor 910. As mentioned previously, lead M is directly connected from the test distributor 910 to the wire chief junctor 510 without passing through the bank contacts. Thereafter, three additional digits are dialed from dial 3050 which are repated via test distributor 910 to leads +OPR and —OPR to the wire chief junctor 510. Relay 4A operates, via contact 3 causes relay 4B to operate at contacts 4 to seize the trunk group marker 550. The trunk group marker 550 pulls the crosspoints for the A and B matrices by closing a circuit through the crosspoints via contacts of relays 4TBY, 4LBY, 4CT, and 4A in series with resistor R1 to lead MFV of the trunk group marker 550.

After the crosspoints have been operated a connection is established from the wire-chief junctor 510 to the incoming register junctor of the register-sender group. This idle register junctor will then cause relay 4CT and 4CO to operate, once the connection has been established. Thereupon, the relay 4CO at contacts 4 provides a ground on lead MVF to indicate to the trunk group marker that the connection has been established.

Thereafter, the wire-chief test desk 920 dials the three digits necessary to reach a given called line. Relay 4A at contact 2 repeats these dial pulses via leads TR and RR to the register junctor. The dial pulses are stored in the register-sender group and then translated. The switching digits are then sent via leads TS and RS to the KIF distributing frame and thence to the group selector. The connection is established through the group selector via crosspoints A, B, and C to the terminating junctor. The first three digits from the sender to the send-receiver circuit 1000 of the line group marker 200 select the line terminal and the fourth digit is normally used for ringing control, but in this case it designates a special call. Since this is a special test call relay 7SPC is operated via contacts 7A–7, 8C–6, 8D–4, and 9S–7 to provide the metallic cut-through path, in response to the coded information transferred from send-receive circuit 1000 via leads A, B, C, and D to relays 8A, 8B, 8C, and 8D. The connection is further established to the line group switching stages via the E, D, B, and A crosspoints to the line circuit for the called line. Furthermore, the information on lead WC1 from the send-receive circuit 1000 causes relays 10WC and 10HD to operate, thereby causing line identifier 1010 to be connected to relay tree 1020 and to operate and hold relay tree 1020 respectively. Relay tree 1020 connects lead WC of an individual line circuit so that the wire-chief relay portion of line group marker 200, comprising relays 10A, 10B, 10C, 10DWC, 10HD, and 10WC, can perform the inward test. Contacts of relays 10WC and 10HD supply potential via lead WO to operate the relay 90FC in parallel with 9SPC. The EC lead is cut-through to the marker via lead CE to relay 10A.

After these connections have been established, the marker returns an indication to the register-sender group. As a result, relay 4CT is operated from the register junctor and is locked via lead CS. Thereafter, the register-sender group and the register junctor are disconnected which thereby causes relay 4CO to restore.

The test desk 920 then has a direct metallic path from the test circuit 3000 via leads +T and −T to the called line, and therefore the outside line can be tested. Assume now, that the outside line tests satisfactorily, the wire-chief test man can then initiate the inward test of the equipment by operation of BCO key 3070, which causes relays R740 and R760 of the test distributor 910 to restore. The restoration of relay R760 and therefore relay R780, causes ground from contacts 781 to be removed from lead EC, thereby causing relay 4EC of the wire-chief junctor 510 to restore. As a result, ground at contacts 1 is removed from lead ECS and at contacts 2 the winding of relay 4TP is open circulated. However, relay 4TP does not restore since it has a slow-to-release characteristic. Meanwhile, the ground being removed from lead ECS causes relay 19A of the line group marker 200 to operate in series with relay 9S of the terminating junctor via contacts 7AN1, 7SPC–4, 70FC–3 and lead CE. The terminating junctor remains seized by keeping relay 9S operated, which cause ground to be maintained to lead CO and to lead C so that both the originating connection from the wire chief junctor to the terminating junctor and the terminating connection from the terminating junctor to the called line remain locked by means of the ground connected to the holding windings of the crosspoint for the group selector switching matrices and the line group switching matrices. Relay 10B of the line group marker 200 had previously operated via ground through contacts of relay 10HD. However, relay 10A shunts relay 10B via contacts of relay 10A. Relay 10B is slow to release, and relays 10A and 10B being operated cause relay 10C to operate.

Now relay 4TP of the wire-chief junctor 510 restores after a 50 millisecond time delay, which in general is a shorter time than the manual release time of the BCO key 3070 of the test desk. Ground is reconnected to lead ECS via the break contact of relay 4TP. Therefore, ground is connected to lead ECS and thence to lead ECO to the terminating junctor. Since the release time for relay 10B is greater than 50 milliseconds, relay 10B of the line group marker 200 remains operated and relay 10A restores. It may be noted that relay 10C remains operated even though relay 10A restores, because the circuit to relay 10C is closed when relays 10B and 10C are operated.

When relay 10A is restored and relays 10B and C are operated, relay 10DWC is thereby connected to relay 10CO of the line circuit associated with the called line via lead WC and relay tree 1020 restoring it to connect line relay 10L. Thereupon, leads T and R are short circuited from the test circuit 3000 of the test desk 920 to thereby simulate a call being originated by the called line. Relay 10L is thereby operated to seize the equipment and establish a call, as if the called line were initiating the call.

Suppose now that the called line can successfully make an originating call, then dial tone is returned via leads T and R to the test circuits 3000 of the test desk 920, thereby designating a successful inward test of the called line. Furthermore, two connections are now established via the line group switching stages, a terminating connection from the wire-chief test desk and an originating connection from the line circuit. Therefore, two connections are made to relay 10CO, and since these connections are in parallel the current to relay 10DWC is increased, thereby causing relay 10DWC to operate. As a result, ground is connected to lead BCU–0 idicating that a busy condtion has occurred and the marker thereby releases. Relay 10DWC also shunts relay 10C, thereby causing relay 10C to restore. Relay 10C restores and opens the circuit to relay 10DWC. Relay 10DWC restores and causes relay 10CO to operate, thereby causing relay 10L to restore. Relay 10L restores to disconnect the originating connection from the called line. As a result, the inward test can be attempted once again by the manual operation of BCO key 3070 at test desk 920.

After a satisfactory inward test has been performed and the wire-chief test man desires to release the entire connection, leads +T and −T are disconnected by restoring distributor key 3010. As a consequence, the originating portion of line group switching stages restore to disconnect ground permanently from lead EC which causes relay 10A to operate and shunt relay 10B for a sufficient time to cause relay 10B to restore. Therefore, relays 10A and 9S restore as a result of the removal of ground from their operate paths via contacts of relay 10B. Relay 9S disconnects ground from lead C to restore the group selector matrix.

*Routiner test call*

The routiner test call proceeds in a similar manner to the wire-chief test call. The routiner 930 initially accesses a 100-line group by impulsing three digits via leads +OC and −OC to relay 5A of the routiner junctor 520. From this point forward, the routiner junctor 520 and the register junctor function in the same manner as the wire-chief test call as previously described to establish a connection to a particular 100-line group.

Thereupon, test circuits 510 of the routiner 930 can test a given line via leads +T and −T, which is a direct, metallic path to the called line. After a test is completed, relay 511 is operated to thereby remove ground from lead EC, which causes relay 7AL2 to operate in series with relay 9S in view of the fact that relay 7SPC is operated for a routiner call (special call) and relay 7OFC is non-operated. Therefore, the terminating junctor remains seized. However, the connection to the called line from the terminating junctor is released, because relay 7AL2 operates and removes ground from lead C to thereby drop the connection. It should also be noted that the connection from the routiner junctor 520 to the terminating junctor remains intact due to the fact that ground is connected via the break contacts of relay 7AN and the make contacts of relay 9S (relay 9S is operated) to lead CO, which holds the group selector crosspoints operated.

Thereupon, routiner 930 causes switching instructions to be transmitted via diphase over leads +T and −T to the line group marker 200 via the terminating junctor to send receive circuit 1000. This function is accomplished by the ground connected to motor magnet 5MM, via contacts of relay 511 of the routiner 930, which causes rotary switch 513 to step to the next position. As a result another set of switching instructions for another line in the 100-line group stored in memory 516 can be transmitted via the diphase sender unit 515. These sender instructions are utilized in the line group marker 200 to establish a connection to the next line in the 100-line group. Thereupon, relay 511 restores and re-connects ground to lead EC to hold the connection for the next line in the group.

Upon release, the relay in the test circuits unit 510 of routiner 930 causes a negative potential to be connected through a resistor to lead EC, thereby indicating release of the routiner 930.

While I have described above the principles of my invention in connection with specific apparatus, it is to be clearly understood that this description is made only by way of example and not as a limitation to the scope of my invention.

What is claimed is:

1. In a communication switching system having a plurality of two-conductor subscriber lines, a marker-controlled switching network having a selector section and a line section for inter-connecting any two of said lines, a plurality of terminating junctors one of which is included between the selector section and the line section in each connection to a called subscriber line, a plurality of line circuits individual to the subscriber lines each having a line relay and a cutoff relay with the line relay connected to the two conductors of the subscriber line via normally closed contacts of the cutoff relay, the line section of the switching network being arranged to switch two transmission conductors to connect them respectively to the two subscriber line conductors and a hold conductor connected to hold the network switches and the cutoff relay operated in a completed connection, the selector section of the network being arranged to switch two transmission conductors, a hold conductor and an extra-control conductor; a wire-chief junctor connected to the input side of the selector section for use in test connections through the selector section to a terminating junctor and thence through a line section to a called subscriber line circuit;

each terminating junctor having a transmission bridge coupling the two transmission conductors from the selector section to the line section, a special relay (7SPC) which is operated on connections from the wire chief junctor to close contacts (2 and 3) bypassing the transmission bridge to provide a metallic connection of the transmission conductors from the wire-chief junctor to the subscriber line;

the improvement comprising a test arrangement including a bridge-cutoff control conductor, a test control conductor (CE) connected in multiple to the terminating junctors, the test conductor being connected in each terminating junctor to contacts of said special relay, means (1020) to selectively connect the bridge-cutoff control conductor to the cutoff relay of the line circuit in a connection from a wire chief junctor;

means responsive to a given signal condition applied from the wire-chief junctor via the extra control conductor to the terminating junctor to cause a signal condition via said contacts of the special relay to said test conductor to in turn cause a signal condition to be applied to said bridge-cutoff control conductor to release the cutoff relay in said called line circuit, to thereby connect the line relay to the transmission conductors so that responsive to the closing of the transmission conductor loop from the wire chief junctor an originating inward test call is initiated from that line circuit.

2. In a communication switching system, the combination as claimed in claim 1, wherein the system includes step-by-step switches includes test connectors, a test desk, switching means for selectively connecting test desk to either said wire-chief junctor or to a test connector, the test desk being arranged to generate an inward test signal condition which is the same whether the connection is completed via a test connector or a wire-chief junctor.

3. In a communication switching system, the combination as claimed in claim 1, wherein said means to cause a signal condition to be applied to said bridge-cutoff control conductor includes a down-check relay (10DWC) which responsive to said signal condition on said test conductor is connected to the bridge-cutoff control conductor to shunt and thereby release said cutoff relay of the line circuit under test.

4. In a communication switching system, the combination as claimed in claim 3, wherein said down-check relay is arranged to remain unoperated when only said test call path exists to the line circuit under test, and to operate responsive to the additional current flow upon the completion of said originating inward test call, and wherein operation of the down-check relay initiates a cycle of operations to open its connection to the bridge-cutoff control conductor, thereby removing the shunt path from the cutoff relay to permit it to reoperate and in turn disconnect the line relay, whereby a repeated inward test call may be initiated.

5. In a communication switching system, the combination as claimed in claim 1, wherein there is provided a test desk, a test distributor to selectively connect the test desk to said wire-chief junctor, the test desk being arranged to generate a bridge-cutoff signal which is repeated via the test distributor to the wire-chief junctor; wherein the wire-chief junctor includes means responsive to the brigde-cutoff signal to apply said given signal condition via the extra control conductor to the terminating junctor.

6. In a communication switching system, the combination as claimed in claim 5, wherein the system further includes step-by-step switches including test connectors, with both the test connectors and said wire-chief junctor being accessible from respective outlets of the test distributor, the test desk being arranged to generate the same bridge cutoff signal whether the test connection is completed via a test connector or a wire-chief junctor.

7. In a communication switching system, the combination as claimed in claim 5, wherein each said terminating junctor includes a seizure relay which is operated by a given potential (ground) on said extra control conductor and held by said given potential supplied from the wire-chief junctor via contacts of a relay (4EC) controlled by a potential from the test distributor, wherein responsive to the bridge-cutoff signal from the tester distributor the last said relay is released to thereby via its contacts remove said given potential from the extra control conductor to the terminating junctor, and a timing relay (4TP) is caused to initiate an operation which after a given time interval reconnects said given potential to the extra control conductor;

wherein said test conductor is connected to the extra control conductor via contacts of said special relay in the terminating junctor, wherein said test arrangement includes a relay (10A) connected to said test conductor so that responsive to removal of said given potential from the extra control conductor the last said relay operates in series with the seizure relay of the terminating junctor to thereby cause said signal condition to be applied to said bridge-cutoff control conductor.

8. In a communication switching system, the combination as claimed in claim 7, wherein said means to cause a signal condition to be applied to said bridge-cutoff control conductor includes a down-check relay, means responsive to the operation of the said relay (10A) connected to the test conductor and its subsequent release upon the given potential being re-applied to the extra control conductor to connect the down-check relay to said bridge-cutoff control conductor to thereby shunt and release said cutoff relay of the line circuit under test.

9. In a communication switching system, the combination as claimed in claim 8, wherein said down-check relay is arranged to remain unoperated when only said test call path exists to the line circuit under test, and to operate responsive to the additional current flow upon the completion of said originating inward test call, and wherein operation of the down-check relay initiates a cycle of operations to open its connection to the bridge-cutoff control conductor, thereby removing the shunt path from the cutoff relay to permit it to reoperate and in turn disconnect the line relay, whereby a repeated inward test call may be initiated.

No references cited.

KATHLEEN H. CLAFFY, *Primary Examiner.*

A. A. McGILL, *Assistant Examiner.*